United States Patent
Diosi et al.

(10) Patent No.: US 8,062,166 B2
(45) Date of Patent: Nov. 22, 2011

(54) PLANETARY TRANSMISSION

(75) Inventors: Gabor Diosi, Friedrichshafen (DE); Josef Haupt, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 834 days.

(21) Appl. No.: 12/114,858

(22) Filed: May 5, 2008

(65) Prior Publication Data

US 2008/0287249 A1    Nov. 20, 2008

(30) Foreign Application Priority Data

May 16, 2007    (DE) .......................... 10 2007 023 125

(51) Int. Cl.
*F16H 57/08*    (2006.01)
(52) U.S. Cl. ........................................ 475/331
(58) Field of Classification Search ................ 475/331
See application file for complete search history.

(56) References Cited

U.S. PATENT DOCUMENTS

| | | | |
|---|---|---|---|
| 3,682,020 A | 8/1972 | Scheiter | |
| 4,189,960 A * | 2/1980 | Holdeman | 475/298 |
| 4,649,771 A | 3/1987 | Atkinson et al. | |
| 4,901,601 A * | 2/1990 | Leggat | 475/331 |
| 6,023,836 A | 2/2000 | Matsuoka et al. | |
| 2007/0249460 A1 | 10/2007 | Schulz et al. | |

FOREIGN PATENT DOCUMENTS

| | | |
|---|---|---|
| DE | 25 08 677 | 9/1976 |
| DE | 4136040 C1 | 11/1991 |
| DE | 10 2004 006 723 A1 | 9/2005 |
| DE | 10 2005 026 617 A1 | 8/2006 |
| GB | 1 529 015 | 10/1978 |

* cited by examiner

*Primary Examiner* — David D Le
*Assistant Examiner* — Derek D Knight
(74) *Attorney, Agent, or Firm* — Davis & Bujold, P.L.L.C.

(57) ABSTRACT

A planetary transmission with at least one planetary gearset including planetary gears supported on a planetary gear carrier. The planetary carrier has inner teeth, which engage outer teeth of a shaft to form a lock tooth array. To secure the planetary carrier axially on the shaft, the planetary carrier is placed with one axial end against a stop on the shaft and the opposite axial end is fixed axially with a circlip fit into a circlip groove in the shaft. At least one axially adjacent component is supported against the planetary carrier such that an axial bearing is arranged radially and axially adjacent to the circlip and includes a roller group guided in a cage and a first check-disk. A second check-disk is arranged radially opposite and at a distance from the circlip in such manner that when assembled, the circlip cannot escape from the circlip groove in the shaft.

7 Claims, 2 Drawing Sheets

PLANETARY TRANSMISSION

This application claims priority from German Application Serial No. 10 2007 023 125.5 filed May 16, 2007.

FIELD OF THE INVENTION

The invention concerns a planetary transmission according to the preamble of claim 1.

BACKGROUND OF THE INVENTION

Planetary transmissions with one or more planetary gearsets have long been known in the most varied forms. For example, from DE 10 2004 006 723 A1, a planetary transmission with planetary gears mounted to rotate on a planetary gear carrier is known. The planetary gears meshing with a ring gear, having teeth on the inside, and with a sun gear.

Furthermore, DE 10 2005 026 617 A1 discloses a planetary transmission with a plurality of planetary gearsets arranged coaxially with one another, in which the planetary gears are mounted to rotate on planetary gear carriers, on the axial end faces of the planetary gear carriers axial bearings in the form of needle bearings are formed. These serve for rotary axial support on adjacent transmission components.

Finally, securing elements for shaft-hub connections are known and formed as circlips. Such circlip securing is known from DE 25 08 677 C3 in which a first circlip is positioned in a groove of a shaft and a second circlip is arranged in a groove in the hub, radially and axially close to the first circlip to secure it against radial escape.

Against that background, the purpose of the present invention is to provide a planetary transmission improved still further, such that a simple and inexpensive structural means enables a planetary carrier arranged on a shaft to be secured axially and in which the ways for securing the planetary carrier axially are themselves secured in their assembled position once the transmission has been assembled.

SUMMARY OF THE INVENTION

The invention concerns a planetary transmission with at least one planetary gearset comprising planetary gears mounted to rotate on a planetary gear carrier. The planetary carrier has inner teeth which mesh with outer teeth on a shaft of the transmission to form a locking tooth array. To axially secure the planetary carrier on the shaft, the planetary carrier is placed with one axial end against a stop on the shaft and its opposite axial end is fixed axially by way of a circlip set into a circlip groove in the shaft. At least one axially adjacent component is supported against the planetary carrier by way of an axial bearing. The axial bearing is arranged radially and axially close to the circlip and consists of at least one group of rollers guided in a cage, a first check-disk and a second check-disk. The second check-disk is arranged radially opposite and a distance away from the circlip such that in the assembled condition, the circlip cannot be removed from the circlip groove.

According to an advantageous embodiment of the invention, the first check-disk is connected to the cage of the axial bearing. Moreover, this first check-disk can have an axial web such that the axial bearing is radially supported on a step of a recess located in the end face of the axially adjacent component.

In contrast, the second check-disk of the axial bearings is preferably made as a separately fitted component and can be fixed on the front of the planetary carrier. In addition, the second check-disk can have a radially outer lip extending axially relative to the planetary carrier, which can be clipped into a radial groove of the planetary carrier when the check-disk is fitted onto the end thereof.

As the invention further provides, the radial distance, which forms an annular gap between the circlip and the second check-disk, is made smaller than the radial section of the circlip located within the circlip groove, in order to prevent radial escape and unintentional release of the circlip from the shaft.

Moreover, the components adjacent to the planetary carrier can consist of the sun gears supported by the shaft, each of which meshes with planetary gears. Finally, it is proposed that at least the axial bearing, arranged radially and axially close to the circlip, is formed by an axial needle bearing.

BRIEF DESCRIPTION OF THE DRAWINGS

The invention will now be described, by way of example, with reference to the accompanying drawings in which.

DETAILED DESCRIPTION OF THE INVENTION

Figure 1:
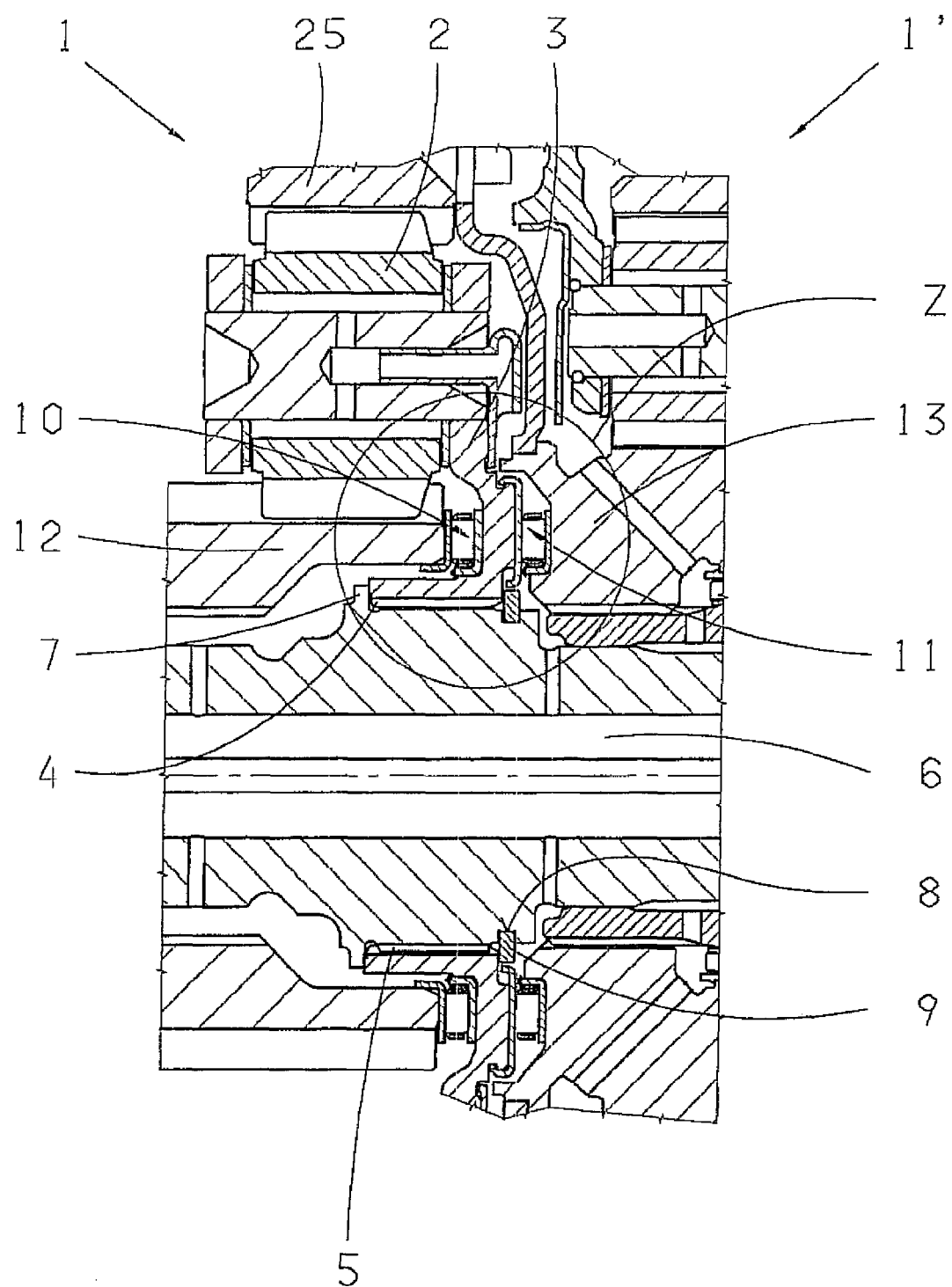
FIG. 1 is a schematic and only partial longitudinal sectional representation of a planetary transmission, according to the invention, in the area of a planetary gearset.
Figure 2:
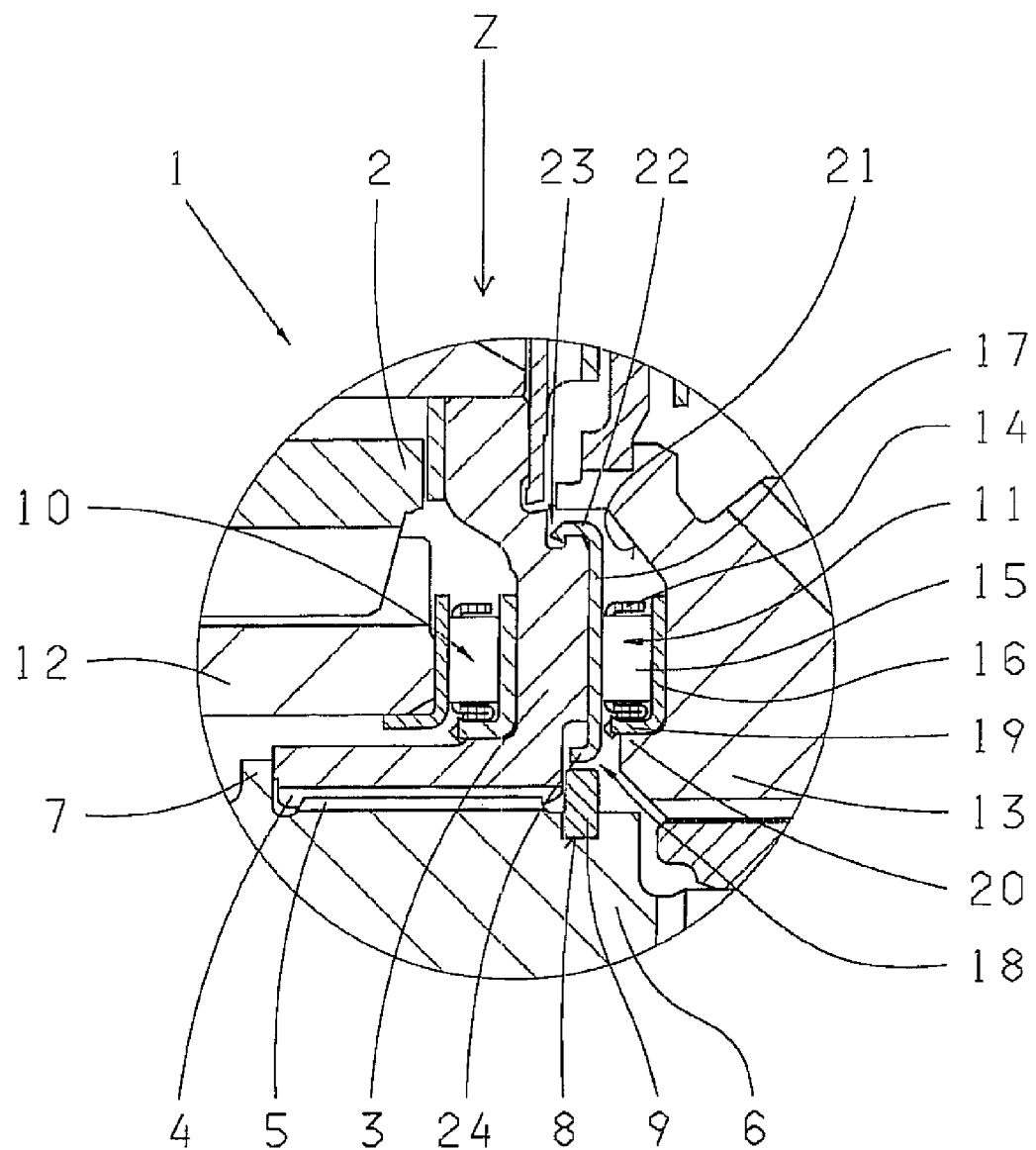
FIG. 2 is a relevant area of the transmission, shown in an enlarged representation of the detail Z in FIG. 1.

FIGS. 1 and 2 show a section of a planetary transmission with a plurality of planetary gearsets 1 and 1', of which one planetary gearset 1 is shown almost completely in longitudinal section. The planetary gearset 1 essentially comprises planetary gears 2 mounted to rotate on a planetary gear carrier 3, and which mesh radially on the inside with a solar gear 12 and radially on the outside with a ring gear 25.

The planetary carrier 3 has axially orientated inner teeth 4 which mesh with outer teeth 5 on a shaft 6, in this case a drive input shaft of the planetary transmission. By virtue of the tooth engagement so formed, the planetary carrier 3 is radially supported on the shaft 6 and can transmit torque from the shaft 6 to the planetary carrier 3. The shaft 6 also has a radially projecting stop 7 against which the planetary carrier 3 rests in intimate contact with an axial end that carries the inner teeth 4. At its other axial end, the planetary carrier 3 is axially secured on the shaft 6 by way of a circlip 9 set into a circlip groove 8 of the shaft 6.

Further, axially adjacent components 12, 13 are supported on the planetary carrier 3 by axial bearings 10, 11 in the form of axial needle bearings. In the present case, the components 12, 13 consist of sun gears supported by the shaft 6 which, as already mentioned, mesh with the planetary gears 2 of the planetary gearsets 1, 1' shown.

As can also be seen from FIGS. 1 and 2, one of the two axial bearings, in this case the axial bearing 11 on the right in the drawing, is arranged radially and axially directly adjacent to the circlip 9 and is composed of at least one group of rollers 15 guided in a cage 14 and a first check-disk 16 and a second check-disk 17, which are arranged at opposite ends of the axial bearing 11.

To ensure that the circlip 9 is effectively secured against unintentional release from the shaft 6 as the result of the lifting of the circlip 9 by increased centrifugal force during the operation of the planetary transmission and/or other circumstances, the second check-disk 17 is arranged radially directly above the circlip 9 and a radial distance away from it. The distance that forms an annular gap 18 is made smaller than the radial section of the circlip 9 located within the circlip groove 8. Thanks to this design, the circlip 9 is simply and inexpensively secured against unintentional release from the shaft 6 since, in this case, the axial bearing 11 is arranged and formed in a particular manner.

With a view to convenient assembly of the planetary transmission constructed according to the invention, it has been found expedient to connect the first check-disk 16 of the axial bearing 11 undetachably to the cage 14 of the axial bearing 11, for example to clip it on, and also to provide it with an axial web 19 for the radial support of the axial bearing 11. Thereby, the component group consisting of the cage 14, rollers 15 and check-disk 16, by way of the check-disk 16 with its axial web 19, can be pushed axially firmly onto a step 20 that corresponds to the check-disk 16 of a recess 21 formed in the opposed end face of the axially adjacent component 13 in the form of a sun gear.

In contrast, the second check-disk 17 of the axial bearing 11 is formed as a separately fitted component and can be fixed at the front onto the planetary carrier 3. For this, a positively locking assembly has been found appropriate in which the second check-disk 17 has a radially outer lip 22 that extends toward the planetary carrier 3, which preferably has a plurality of axially effective barbs on its circumference such that when the check-disk 17 is fitted onto the front of the planetary carrier 3, the lip 22 can be held in a radial groove 23 on the latter.

As can also be seen from FIGS. 1 and 2, the second check-disk 17 also has a radially inner lip 24 which extends axially towards the planetary carrier 3, which serves to stiffen the second check-disk 17 and covers the circlip 9 axially while leaving the radial spacing free. Thus, during the production of the second check-disk 17, by appropriate deformation of this lip 24 radially inward or radially outward, i.e., away from or toward the circlip 9, the chosen spacing or radial width of the annular gap 18 formed can be adjusted extremely exactly.

The lips 22 and 24 can be formed as circular axial webs. It is also possible to provide only individual, tooth-like lips 22, 24 distributed uniformly about the circumference of the second check-disk 17, where both material and weight are saved.

Expediently, a planetary transmission is assembled with the main shafts of the planetary transmission or the transmission orientated vertically, essentially as described below.

First, the planetary carrier 3 is connected by way of the locking teeth to the shaft 6 or threaded onto it, and pushed as far as the axial stop 7. Then, the circlip 9 is fitted into the circlip groove 8 of the shaft 6. After this, the second check-disk 17 of the axial bearing 11 can be engaged in the annular radial groove 23 of the planetary carrier 3 so that the second check-disk 17 is connected undetachably to the planetary carrier 3. At the same time, already in this structural condition, the circlip 9 can no longer be inadvertently released from the shaft 6.

Finally, in an assembly step, if necessary, carried out later the component group comprising the cage 14, rollers 15 and the first check-disk 16 can be positioned in the axially adjacent component 12, here in the form of a sun gear. By virtue of the subsequent connection of the preassembled preliminary structural group of the shaft 6 with the planetary carrier 3 and the second check-disk 17 with the sun gear 13 and other components (not shown here) and connected to the sun gear, the axial bearing 11 can make contact with the second check-disk 17 and can therefore fulfill its function as a bearing.

REFERENCE NUMERALS

1, 1' planetary gearset
2 planetary gears
3 planetary gear carrier
4 inner teeth on the planetary carrier 3
5 outer teeth on the shaft 6
6 shaft
7 stop
8 circlip groove
9 circlip
10 axial bearing
11 axial bearing
12 component, sun gear
13 component, sun gear
14 cage
15 rollers, group of rollers
16 first check-disk
17 second check-disk
18 annular gap
19 axial web on the first check-disk 16
20 step
21 recess
22 lip
23 radial groove on the planetary carrier 3
24 lip
25 ring gear

The invention claimed is:

1. A planetary transmission with at least one planetary gearset (1, 1') having planetary gears (2) mounted for rotating on a planetary gear carrier (3), the planetary gear carrier (3) having inner teeth (4) which mesh with outer teeth (5) of a shaft (6) to form a locking tooth array;
   the planetary gear carrier (3) being positioned with an axial end abutting against a stop (7) on the shaft (6) and being, at an opposite axial end, axially fixed by a circlip (9) inserted in a circlip groove (8) of the shaft (6);
   at least one axially adjacent component (12, 13) being supported against the planetary gear carrier (3) by an axial bearing (10, 11), the axial bearing (11) being arranged radially and axially adjacent to the circlip (9) and comprising at least one group of rollers (15) guided in a cage (14) and a first check-disk (16) and a second check-disk (17) with the second check-disk (17) being arranged radially upward from and at a radial distance away from the circlip (9) in such manner that, following assembly, the circlip (9) is restrained from escaping out of the circlip groove (8) of the shaft (6);
   wherein the first check-disk (16) is securely connected to the cage (14) of the axial bearing (11); and
   the first check-disk (16) has an axial web (19) which radially supports the axial bearing (11) on a step (20) of a recess (21) formed in an end face of the axially adjacent component (13).

2. The planetary transmission according to claim 1, wherein the second check-disk (17) of the axial bearing (11) is a separately fitted component and is fixed on the opposite axial end of the planetary gear carrier (3).

3. A planetary transmission with at least one planetary gearset (1, 1') having planetary gears (2) mounted for rotating on a planetary gear carrier (3), the planetary gear carrier (3) having inner teeth (4) which mesh with outer teeth (5) of a shaft (6) to form a locking tooth array;
   the planetary gear carrier (3) being positioned with an axial end abutting against a stop (7) on the shaft (6) and being, at an opposite axial end, axially fixed by a circlip (9) inserted in a circlip groove (8) of the shaft (6);

at least one axially adjacent component (12, 13) being supported against the planetary gear carrier (3) by an axial bearing (10, 11) the axial bearing (11) being arranged radially and axially adjacent to the circlip (9) and comprising at least one group of rollers (15) guided in a cage (14) and a first check-disk (16) and a second check-disk (17) with the second check-disk (17) being arranged radially upward from and at a radial distance away from the circlip (9) in such manner that, following assembly, the circlip (9) is restrained from escaping out of the circlip groove (8) of the shaft (6);

wherein the second check-disk (17) of the axial bearing (11) is a separately fitted component and is fixed on the opposite axial end of the planetary gear carrier (3); and the second check-disk (17) has a radially outer lip (22) which extends axially toward the planetary gear carrier (3), and which is clipped into a radial groove (23) of the planetary gear carrier (3) when the check-disk (17) is assembled onto the opposite axial end of the planetary gear carrier (3).

4. The planetary transmission according to claim 3, wherein the first check-disk (16) is securely connected to the cage (14) of the axial bearing (11).

5. The planetary transmission according to claim 3, wherein a radial distance, between the second check-disk (17) and the circlip (9), forms an annular gap (18) which is smaller than a section of the circlip (9) located within the circlip groove (8).

6. The planetary transmission according to claim 3, wherein at least the axial bearing (11), radially and axially adjacent to the circlip (9), is an axial needle bearing.

7. A planetary transmission comprising:

at least one planetary gearset (1, 1') having planetary gears (2) rotatably supported on a planetary carrier (3), the planetary carrier (3) being is non-rotatably fixed on a shaft (6) by a toothing array, and the planetary carrier (3) having a first axial end and an opposed second axial end;

a stop (7), provided on the shaft (6), engaging the first axial end of the planetary carrier (3) for preventing axial movement of the planetary carrier in one axial direction;

a circlip groove (8) being formed in the shaft (6) for retaining a circlip (9) and being axially located such that the circlip (9), following installation, engaging the opposite second axial end of the planetary carrier (3) for preventing axial movement of the planetary carrier (3) in an opposite axial direction;

a second check-disk (17) being coupled to the second axial end of the planetary carrier (3) and being axially directly radially above the circlip (9) such that the second check-disk (17) prevents dislodgement of the circlip (9) from the circlip groove (8); and an axial bearing (10, 11) being supported axially between a first check-disk (16) and the second check disk (17) by a component (12, 13) and the first check disk (16), wherein the first check-disk (16) has an axial web (19) and is radially supported by the component (12, 13) and the second check-disk (17) has a lip (22) that is radially supported by a radial groove (23) in the second axial end of the planetary carrier (3).

\* \* \* \* \*